United States Patent [19]

Doyel

[11] 4,101,999
[45] Jul. 25, 1978

[54] BATTERY OPERATED DEVICE FOR CLEANING PHONOGRAPH RECORDS AND THE LIKE

[76] Inventor: John S. Doyel, 404 W. 20th St., New York, N.Y. 10011

[21] Appl. No.: 758,703

[22] Filed: Jan. 12, 1977

[51] Int. Cl.² ............................................. B08B 6/00
[52] U.S. Cl. .................................. 15/1.5 R; 15/21 B; 15/97 R; 15/308
[58] Field of Search .............. 15/1.5 R, 421 A, 21 R, 15/21 B, 77, 97 R, 102, 306 R, 302, 310, 311, 308; 274/47

[56] References Cited

U.S. PATENT DOCUMENTS

| | | | |
|---|---|---|---|
| 2,338,843 | 1/1944 | Glaser et al. | 15/1.5 R X |
| 3,005,223 | 10/1961 | Taylor et al. | 15/310 |
| 3,150,401 | 9/1964 | Taylor et al. | 15/1.5 R X |
| 3,365,739 | 1/1968 | Olinghouse | 15/21 A |
| 3,654,660 | 4/1972 | Taylor et al. | 15/308 |

Primary Examiner—Edward L. Roberts
Attorney, Agent, or Firm—Cooper, Dunham, Clark, Griffin & Moran

[57] ABSTRACT

A portable battery driven device cleans phonograph records and the like by vacuuming, by concurrently brushing (with brushes that can be moistened with a record cleaning fluid) and by concurrently removing static electrical charge from the record.

7 Claims, 7 Drawing Figures

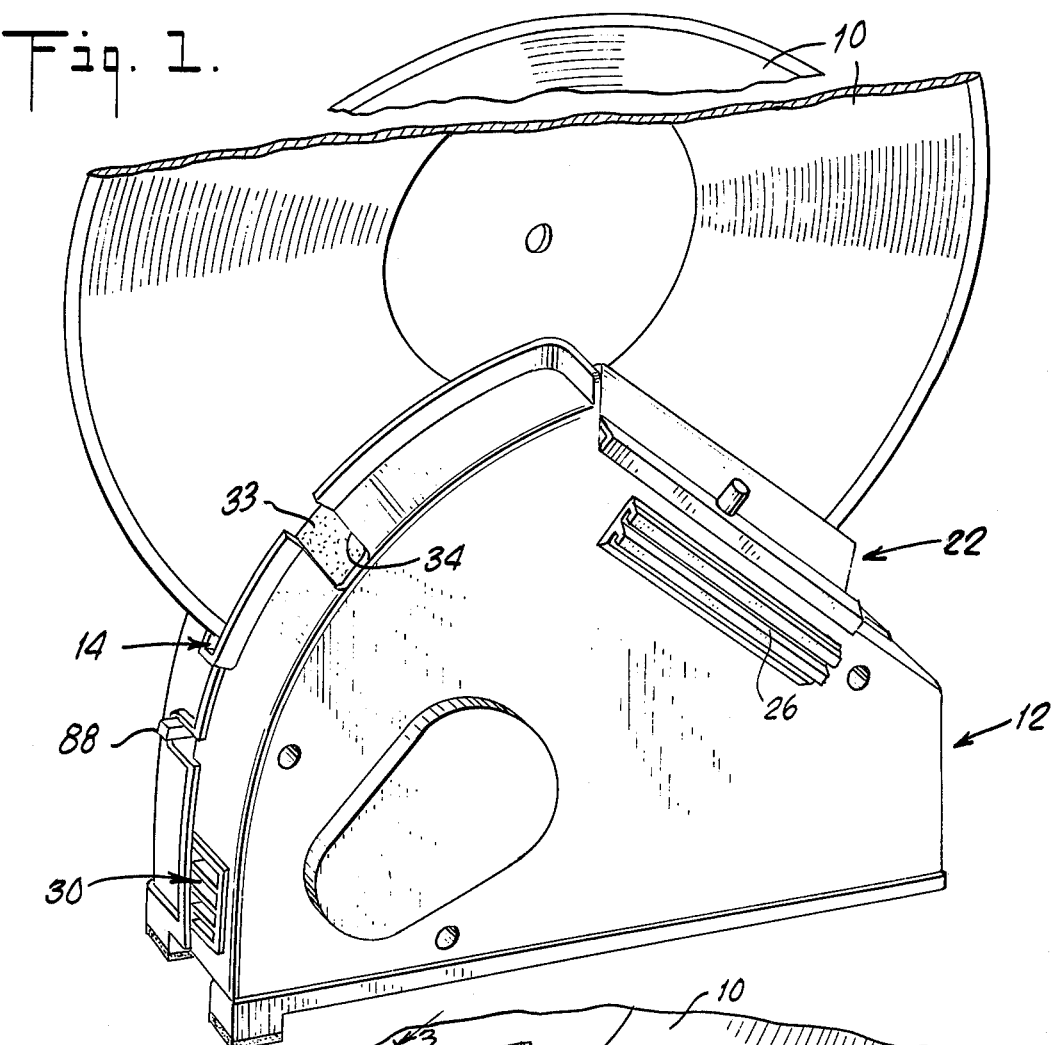
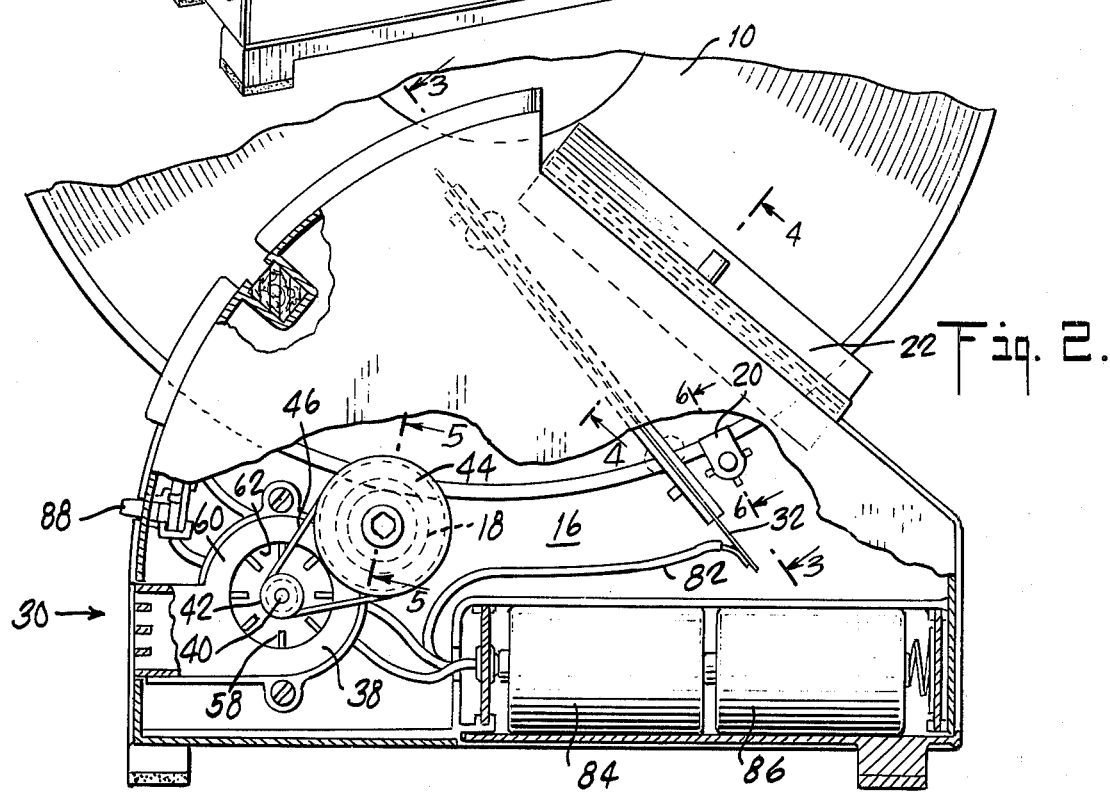

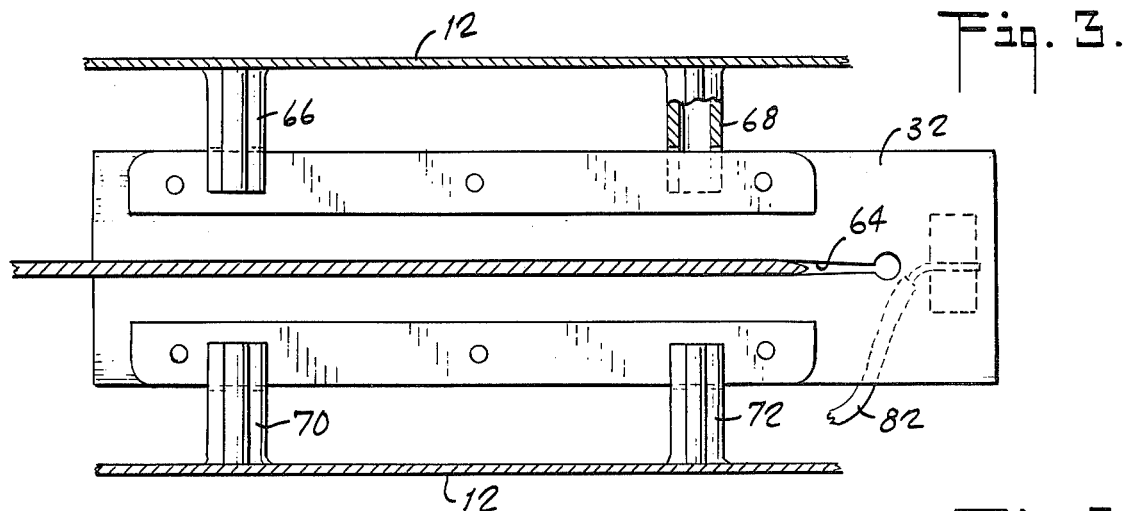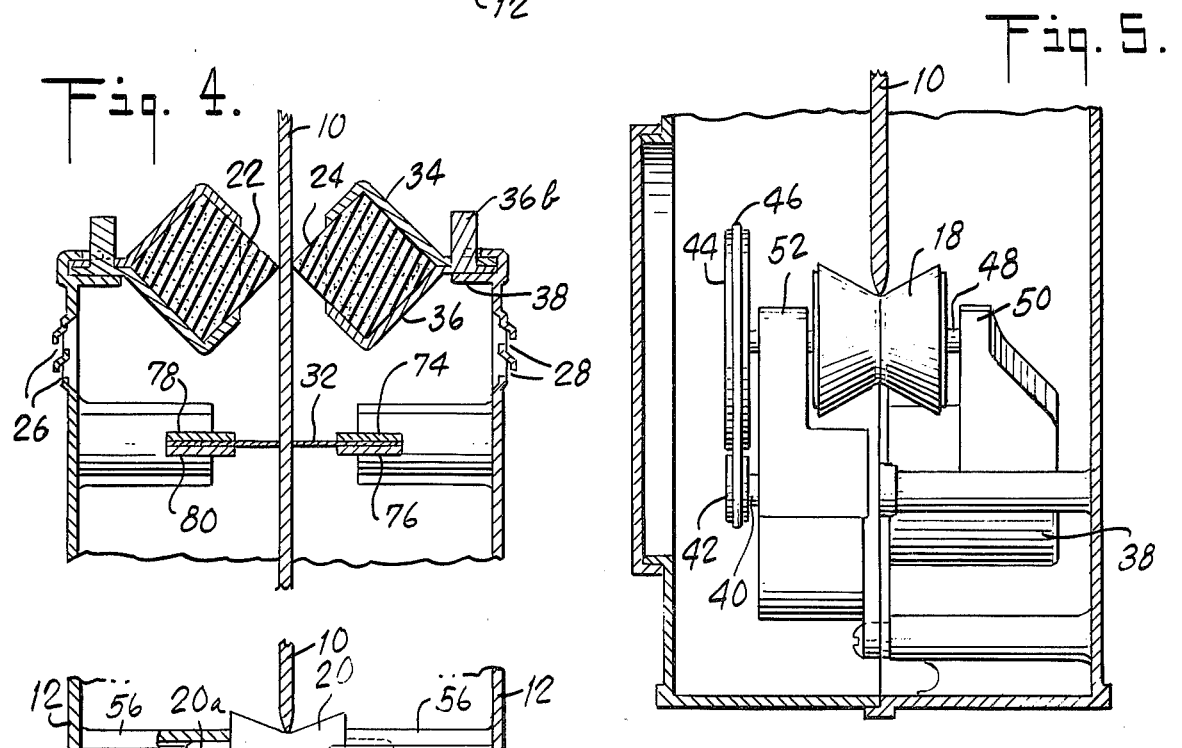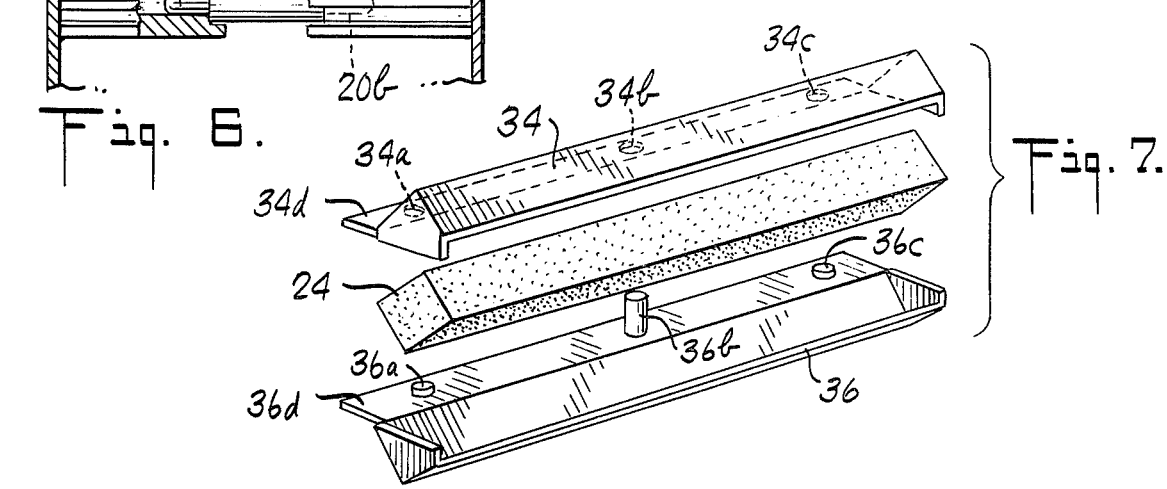

BATTERY OPERATED DEVICE FOR CLEANING PHONOGRAPH RECORDS AND THE LIKE

BACKGROUND OF THE INVENTION

The invention is in the field of devices which use vacuum, air flow, brush and electrical charge dissipating action to remove dust and other particles and to remove static electricity from phonograph records and the like. It is particularly concerned with portable battery powered devices for doing this efficiently and inexpensively.

There are various prior art devices for cleaning phonograph records. Examples are described in Taylor, et al, U.S. Pat. Nos. 3,005,223; 3,150,401; and 3,654,660, and a device of this type is made by VOR Industries of California under the name VAC-O-REC. These prior art devices typically have a housing into which the record is partly inserted through a record slot. The record is supported in the housing on its edge at three points and is frictionally driven for rotation at one of them. Brushes along the slot center the record, and an electrically conductive strip of foil in the housing contacts the record to dissipate electrical charge from it. An electrical motor connected to a household current outlet rotates the record and also drives a vacuum blower to pick up dust from the record and the brushes. Such prior art devices may not have sufficient versatility, low cost or ease of use in certain cases. For example, these prior art devices must be connected to a household current outlet, which limits their choice of location and makes them less convenient to move from place to place. Moreover, some types of dirt on records, such as grease or fingermarks, can not be removed effectively by these prior art devices, but must be removed by separate washing of the records. This is inconvenient, and may also result in danger if a wet record is cleaned with such prior art devices, this danger being the possibility of an electric shock at household outlet voltage. In addition, these prior art devices, so far as known to applicant, work well only with the regular size LP records since they support the record edge at three fixed points.

In view of this prior art, there is a need for a record cleaning device which is highly portable, can be used at any location and can be easily moved from place to place, a device which in many cases can clean by itself dirt, such as grease and finger marks from records, without the danger of electrical shock of the user, a device which can work well with records of the several common sizes without any resetting, a device which can effectively remove static charge, and a device with these characteristics which would be inexpensive to make and maintain and would be convenient to use. This invention is directed to providing a device meeting such needs.

One specific embodiment of the invention is a device which comprises a housing enclosing a cleaning chamber. The housing has an elongated record slot through which a record is at least partly inserted into the cleaning chamber. A pair of cleaning brushes flank the record slot along the forward part of its length. The brushes contact and engage portions of the opposite sides of the record inserted in the slot. The brushes, which can be made of foam material, can be moistened with a record cleaning solution to help clean the record. In addition, each of the brushes is easily removable for washing and can then be replaced with a fresh edge facing the record. Alternately, a new brush may be conveniently installed. A pair of jaws grip each brush but expose one of its long edges to face and contact the record. The jaws are easily removable from the housing, and from each other, to free the brush for cleaning or replacement, and easily reassemble and reconnect to the housing.

The part of the record inserted into the cleaning chamber is supported along its edge by a V-section pulley and a V-section guide. The pulley, covered with a resilient high friction material, is V-shaped in axial section, and the record edge fits in the bottom of the V. The record is supported at a second point, spaced along the record edge from the pulley, by the V-section guide. The guide and the pulley, both supported in the housing, flank the center of gravity of the record, and can support records of various sizes without any readjustment of the device. The pulley is driven by a battery powered electric motor via a drive belt to thereby rotate the record about its normal axis. The motor is in the rear of the housing, with its shaft extending transversely between the sidewalls of the housing. The same motor drives a vacuum blower, for vacuuming the record portion which is in the housing. The batteries for the motor are in the base of the housing.

The exemplary device embodying the invention has a pair of air inlets in the sidewalls of the housing, which inlets are spaced from the record slot and flank the sides of the record portion which is in the housing. Air is drawn into the cleaning chamber through the air inlets as well as perhaps through the record slot. There is an air outlet at the rear of the housing for the exiting air. The airflow created by the blower thus enters the cleaning chamber through the air inlets and perhaps the record slot, picks up dust and other particles from the record portion which is in the cleaning chamber, and exits through the air outlet at the rear of the housing.

The housing also encloses a static charge dissipating strip which is in the cleaning chamber and has a slit along part of its length to receive and contact the part of the record which is in the cleaning chamber. The strip may be a single piece of resilient, electrically conductive material such as aluminum coated resilient plastic sheet (e.g., Mylar) which is connected to a floating electrical ground to discharge static charge that may be on the record.

In operation, the battery powered motor drives the V-section pulley to rotate the record inserted in the cleaning chamber. As the record rotates, the brushes rub against, or at least contact, the respective sides of the record to remove or at least dislodge dust or other particles that may be on the record. The dust or other particles are drawn away from the brushes and the record by the air flow created by the blower, which is also driven by the same motor. Static electrical charge that may be on the record is dissipated as the record rotates by the static charge dissipating strip. The brushes, which may be made of liquid absorbing material, may be moistened, e.g., with record cleaning fluid, to help remove or dislodge particles and to help remove grease and finger marks or other such matter that may be on the record. The brushes can be conveniently removed for washing, and may be reinstalled with a different, fresh edge, facing the record, or the entire brush may be easily replaced. Since the device is battery operated it can be installed anywhere and can be conveniently moved from place to place. Moreover, there is no danger of an electric shock to the user. Because of the efficient operation of the device, the battery drain is low while the cleaning action is thorough.

BRIEF DESCRIPTION OF THE DRAWINGS

FIG. 1 is a perspective view of a phonograph record cleaner in accordance with the invention.

FIG. 2 is a partly elevational and partly sectional side view thereof.

FIG. 3 is a partial sectional view taken along 3—3 of FIG. 2.

FIG. 4 is a partial sectional view taken along 4—4 of FIG. 2.

FIG. 5 is a partial sectional view taken along 5—5 of FIG. 2.

FIG. 6 is a partial sectional view taken along 6—6 of FIG. 2.

FIG. 7 is an exploded perspective view of a cleaning brush and brush jaws forming a part of the record cleaner of FIG. 1.

DETAILED DESCRIPTION

Referring to FIGS. 1 and 2, a record 10 is partly inserted into the housing 12 of a record cleaner which forms one embodiment of the invention. The lower portion of the record 10 enters the housing 12 through an elongated slot 14 and is supported within a cleaning chamber 16. The bottom edge of the record rests at the notch of a V-shaped pulley 18 (FIGS. 2 and 5) and the notch of a guide 20 (FIGS. 2 and 4). The pulley 18 is rotated as described below to slowly turn the record 10 about its normal axis of rotation. As the record 10 rotates, its grooved sides rub against brushes 22 and 24, which help remove or dislodge dirt on the record and may be moistened, as with record cleaning fluid, to help clean grease, finger marks and other matter from the record. Additionally, there is an air flow created as described below of air which enters the interior of the housing 12 through intake slots 26 and 28 (FIGS. 1 and 4), and perhaps through the record slot 14 as well and exits the housing 12 through an air outlet 30. Still additionally, a static removing strip 32 (FIGS. 2 and 3), which is electrically conductive and is suitably electrically grounded, rubs against the grooved sides of the record 10 and picks up static electricity that may be on the record. The record 10 rotates about its axis for one or more complete revolutions so that its entire grooved surfaces may be thoroughly cleaned.

When the record 10 is inserted in the housing 12 as indicated in FIGS. 1 and 2, its bottom edge is centered with respect to the record slot 14 because it rests at the notches of the pulley 18 and the guide 20 and because it is flanked by the brushes 22 and 24, as best seen in FIG. 4, and by a pair of guides of which only a guide 33, removably secured in a slot 34, is visible in FIG. 1. A corresponding guide removably secured in a corresponding slot is disposed opposite the guide 33, behind the record 10 as viewed in FIG. 1. The guide 33 and its counterpart are made of a soft material, such as felt, and are closer to each other than the facing sides of the record slot 14 such that the record 10 is kept from touching the hard plastic material of the record slot 14 but touches instead only the guides 33 and the brushes 22 and 24.

The brushes 22 and 24 are secured to the housing 12 such that they can be easily removed for cleaning or replacement. In particular, referring to FIGS. 4 and 7, the brush 24, which is in the form an elongated bar of square cross section, is gripped between jaws 34 and 36 such that one of its long edges is exposed and the exposed edge faces a corresponding exposed edge of the other brush 22. The entire brush assembly comprising the brush 24 and the jaws 34 and 36 can be taken apart by hand as indicated in FIG. 7 and can be put back together by aligning the pegs 36a, 36b and 36c extending from a flange 36d of jaw 36 and corresponding holes 34a, 34b and 34c in a corresponding flange 34d of jaw 34 and pressing the two jaws toward each other such that the pegs enter the holes. The flanges 34d and 36d then slide in a frictional fit in a corresponding channel 38 (FIG. 4) where they are held in a frictional fit. The entire brush assembly can be removed by pushing the jaws or the pin 36b toward the other brush assembly such that the flanges 34d and 36d slide out of the channel 38. When taken apart as illustrated in FIG. 7, the brush 24 may be washed to remove dirt that it may have picked up, and the brush assembly may be reassembled with a different long edge of the brush 24 facing toward the other brush. The entire brush 24 may also be replaced. The two brush assemblies are identical so that the brush assembly including the other brush 22 need not be described again. The brush 24 may be made of a liquid absorbing material such as urethane foam so that it can be moistened with a record cleaning solution to facilitate cleaning and so that it can easily be washed.

Referring to FIGS. 2 and 5, the record is supported and is centered with respect to the record slot 14 by the pulley 18 and the guide 20. The pulley 18 is additionally used to drive the record for rotation about its normal axis. As seen in FIG. 5, the pulley 18 is V-shaped in axial section, and the part engaging the record is covered with a high friction material such as a wide rubber band stretched over the V-shaped portion of the pulley. The pulley 18 is rotated about its axis by a motor 38 whose shaft 40 has affixed to it a driving pulley 42. The pulley 42 drives another pulley 44 via a drive belt 46. The pulleys 44 and 18 are affixed to the same shaft 48 journaled at suitable supports 50 and 52 affixed to the housing 12.

As best seen in FIGS. 2 and 6, the bottom edge of the record 10 is also supported at a guide 20 which has a V-shaped notch receiving the record edge, and has pegs 20a and 20b journaled at supports 54 and 56 secured to the housing 12. The V-shape of the pulley 18 and the guide 20 center the record 10 properly and the fact that the record is supported at only two points and that the guide 20 is journaled for free rotation at supports 54 and 56 help the device accomodate records of different sizes without any adjustments. The guide 20 is made of a low friction material, such as Delron, and this plus the fact that it can rotate freely help provide a built-in floating adjustment of the record cleaner to records of different sizes.

In addition to the cleaning action due to the brushes 22 and 24 wiping the grooved sides of the record, there is an air flow which impinges on the grooved sides of the record portion that is in the cleaning chamber and exits from the device carrying dirt and other particles. As best seen in FIG. 2, this air flow is created by a cage fan 58 affixed to and rotating with the shaft 40 of the same motor 38 which drives the V-shaped pulley 18. The cage fan 58 rotates within a housing 60 which has an opening 62 communicating for air flow with the cleaning chamber 16 and has an exhaust chute for directing air drawn from the cleaning chamber 16 out of the exhaust opening 30. The main part of the air flow enters the cleaning chamber 16 through the air intake slots 26 and 28 (FIG. 4).

Static electricity from the record is removed with the help of an electrically conductive resilient strip 32 which, as best seen in FIGS. 2 and 3, is disposed within the cleaning chamber 16 and has a central slit 64 to receive the record 10. The strip 32 is made of a material such as an aluminum coated Mylar, and is held in place by being affixed to supports 66, 68, 70 and 72 affixed to the housing 12. As best seen in FIGS. 3 and 4, the long outside edges of the strip 32 are pinched between relatively rigid plastic strips 74, 76, and 78, 80 secured as shown in the supports 66–72. These supports having facing slots into which the strips 74, 76 and 78, 80 are held in frictional fit such that the strip 32 can be easily inserted in place and can be removed for replacement if necessary. The strip 32 is electrically connected by means of a wire 82 to one pole of batteries 84, 86 (FIG. 2), which are connected electrically with the motor 38 through an off-on switch 88.

In operation of the device described above, a record 10 is inserted in the record slot 14 as indicated in FIGS. 1 and 2 such that its edge rests on the pulley 18 and the guide 20 as indicated in FIGS. 5 and 6. The motor 38 is then turned on by connecting the batteries 84, 86 to it through switch 88. The motor 38 drives the pulley 18 to slowly rotate the record 10 and drives the cage fan 58 to create an air flow entering the cleaning chamber 16 through the air inlets 26 and 28 and perhaps through the record slot 14 and impinging on the grooved sides of the record part which is in the cleaning chamber 16. The air flow, and any particles carried by it, exit through the outlet 30. As the record 10 is slowly rotated, its grooved sides are wiped by the edges of the brushes 22 and 24 which contact, it and electrical static charge that may be carried by it is dissipated by the strip 32 which is at the floating electrical ground of one side of the batteries 84, 86. The record is kept from being scratched at the record slot 14 by the felt guides 33.

I claim:

1. A device for cleaning phonograph records comprising:
a housing enclosing a cleaning chamber and having an elongated record slot through which a record is at least partly inserted into the cleaning chamber;
means for supporting the part of the record inserted into the cleaning chamber and for rotating the record about its axis so as to move successive parts of the record through the cleaning chamber;
means for causing an air flow impinging on the sides of the record part which is in the cleaning chamber, rather than on the record part which is outside of or at an entrance to the cleaning chamber, and thence exiting from the device, said air flow causing means including elongated air inlets in the housing which face the sides of a record inserted in the cleaning chamber; and
means for dissipating static electrical charge and means for supporting the dissipating means in electrical contact with the record part which is in the cleaning chamber to reduce thereby the static electrical charge that may be present on the record.

2. A record cleaning device as in claim 1 including a pair of brushes flanking the record slot at least along a part of the length thereof to contact both sides of a record inserted in the slot, and means for removably securing the brushes to the housing to permit their removal from the housing for cleaning and subsequent replacement on the housing.

3. A record cleaning device as in claim 2 wherein each brush comprises soft, absorbant material contacting the record and capable of being soaked with record cleaning solution to facilitate cleaning of the record.

4. A device as in claim 1 wherein the means for supporting and rotating the record comprise a V-section pulley having resilient, high friction material at least at the notch of the V, and a guide spaced from the pulley, said pulley and guide being secured to the housing at locations spaced from each other to support the edge of the record portion which is in the cleaning chamber and flanking the center of gravity of the record, whereby differently sized records can be supported by said guide and pulley, and a motor secured to the housing and coupled with said pulley to rotate the pulley and thereby rotate the record about its axis.

5. A device as in claim 1 wherein the means for causing an airflow comprise: means defining a pair of air inlets in the housing which are spaced from the record slot and flank the sides of the record portion which is in the housing, an air outlet from the housing, said inlets and outlet communicating with the cleaning chamber, an electric motor, batteries for supplying electrical power to the motor and a blower driven by the motor for creating an air flow entering the cleaning chamber through said air inlet, impinging on the respective sides of the record and existing the cleaning chamber and the device through said air outlet.

6. A device as in claim 1 wherein the static charge dissipating means comprise: an electrically conductive resilient strip disposed in the cleaning chamber and having a slit along at least a part of its length for receiving and contacting the record part which is in the cleaning chamber, and means for electrically connecting the conductive strip to at least a floating electrical ground.

7. A device for cleaning phonograph records comprising:
a housing enclosing a cleaning chamber and having an elongated record slot through which a record is at least partly inserted into the cleaning chamber;
means for supporting the part of the record inserted into the cleaning chamber and for rotating the record about its axis so as to move successive parts of the record through the cleaning chamber;
means for causing an air flow impinging on the sides of the record part which is in the cleaning chamber;
means for dissipating static electrical charge and means for supporting the dissipating means in electrical contact with the record part which is in the cleaning chamber to reduce thereby the static electrical charge that may be present on the record;
a pair of brushes flanking the record slot at least along a part of the length thereof to contact both sides of a record inserted in the slot and means for removably securing the brushes to the housing to permit their removal from the housing for cleaning and subsequent replacement on the housing;
each brush comprising soft, absorbant material contacting the record and capable of being soaked with record cleaning solution to facilitate cleaning of the record; and
wherein each brush comprises an elongated piece of foam material and the means for securing the brushes to the housing comprise, for each brush, a pair of jaws gripping the brush but exposing an elongated strip thereof facing and contacting the record and means for securing the two jaws to each other at a selected relative position and means for removably securing the jaws to the housing.

* * * * *